United States Patent [19]

Mangels et al.

[11] 4,388,414
[45] Jun. 14, 1983

[54] THERMALLY STABLE SILICON NITRIDE MATERIAL

[75] Inventors: John A. Mangels, Flat Rock; John R. Baer, Ypsilanti, both of Mich.

[73] Assignee: Ford Motor Company, Dearborn, Mich.

[21] Appl. No.: 332,918

[22] Filed: Dec. 21, 1981

[51] Int. Cl.³ .............................................. C04B 35/58
[52] U.S. Cl. .................................... 501/98; 264/332; 264/65; 501/152; 501/154
[58] Field of Search ..................... 501/98, 97, 152, 154

[56] References Cited

U.S. PATENT DOCUMENTS

| 4,102,698 | 7/1978 | Lange et al. | 501/98 |
| 4,264,548 | 4/1981 | Ezis | 501/98 |
| 4,264,550 | 4/1981 | Ezis | 264/65 |
| 4,280,850 | 7/1981 | Smith et al. | 501/97 |
| 4,285,895 | 8/1981 | Mangels et al. | 501/98 X |
| 4,323,325 | 4/1982 | Samanta et al. | 501/98 X |
| 4,341,874 | 7/1982 | Nishida et al. | 501/97 |
| 4,354,990 | 10/1982 | Martinengo et al. | 501/154 X |

*Primary Examiner*—Helen M. McCarthy
*Attorney, Agent, or Firm*—William E. Johnson; Olin B. Johnson

[57] ABSTRACT

A thermally stable, oxidation resistant ceramic $Si_3N_4$ material is disclosed. The material has a substantially pure primary phase formed of substantially pure silicon nitride. A substantially pure secondary phase of the material is formed of a material selected from the group consisting essentially of $Si_3N_4/SiO_2/4Y_2O_3$, $Si_3N_4/SiO_2/2Y_2O_3$ and $Si_3N_4/4SiO_2/5Y_2O_3$. The primary phase may be in the form of individual grains and the secondary phase may be in the form of grain boundaries between the individual grains.

1 Claim, 6 Drawing Figures

THERMALLY STABLE SILICON NITRIDE MATERIAL

The invention herein described was made in the course of or under a contract or subcontract thereunder (or grant) with the National Aeronautics and Space Administration, Contract #DEN3-167, Subcontract #P-1928150.

TECHNICAL FIELD

This invention is generally directed to a silicon nitride ceramic material and more particularly to a silicon nitride ceramic material which is stable under various thermal conditions, particularly a thermal condition of operating at a temperature of approximately 1000° C.

Thermally stable silicon nitride ceramic material may find a variety of uses, for example, in fabrication of various components of a gas turbine engine. Components which may be fabricated from silicon nitride include not only the rotor and the stator for such turbines, but also shrouds and liners for such engines.

BACKGROUND ART AND PRIOR ART STATEMENT

No search was conducted on the subject matter of this specification in the U.S. Patent and Trademark Office or in any other search facility.

The most relevant prior art of which we are aware is U.S. Pat. No. 4,102,698, issued July 25, 1978 to Lange et al. This patent is for silicon nitride compositions in the $Si_3N_4/Y_2O_3/SiO_2$ system. The patent discusses the ternary phase diagram of the $Si_3N_4$, $SiO_2$ and $Y_2O_3$ system. The patent teaches that within that system there is a so-called stable range of compositions for materials and an unstable region for certain compositions of such materials. By unstable, it is meant that a material will oxidize and degrade at 1000° C. under oxidizing conditions. If a material is stable, it does not oxidize under oxidizing conditions at 1000° C.

W. D. Caruthers, in "3500-Hour Durability Testing of Ceramic Materials" NASA Contract DEN 3-27, Third Progress Report, December, 1978, observed that the $Si_3N_4/Y_2O_3$ components defined as unstable by Lange are unstable in the temperature range of 700°–1000° C.

In a general sense, degradation of the material will result in strength losses after oxidation exposures. This is the ultimate test for a material. A stable material will have low oxidation weight gains, but more importantly will exhibit little or no strength losses after oxidation exposure.

Normally, the materials discussed in the Lange patent are materials in which generally individual pure grains of silicon nitride have grain boundaries formed of mixtures of silicon nitride, silicon dioxide and yttrium oxide. The yttrium oxide is introduced into these materials as a sintering aid and is usually present in a range of 3–10 mole%. The silicon dioxide is introduced into these materials as an impurity and remains as silicon dioxide no matter how carefully the silicon nitride powder is prepared.

We have found that we can make thermally stable ceramic materials even though the material in the grain boundary falls into materials classified by the Lange et al patent as being unstable. We have found further that we can make thermally stable materials if the secondary phase forming the grain boundaries is a substantially pure material rather than a mixture of various materials.

DISCLOSURE OF INVENTION

This invention relates to a thermally stable ceramic material and more particularly to a thermally stable ceramic material based substantially upon silicon nitride.

In accordance with the teachings of this invention, a thermally stable ceramic material comprises the following. A primary phase is formed of substantially pure silicon nitride. A secondary phase is formed of substantially pure material selected from the group of materials consisting essentially of $Si_3N_4/SiO_2/4Y_2O_3$ ($Y_4Si_2O_7N_2$), $Si_3N_4/SiO_2/2Y_2O_3$ ($YSiO_2N$), and $Si_3N_4/4SiO_2/5Y_2O_3$ ($Y_{10}Si_7O_{23}N_4$). The substantially pure silicon nitride phase generally forms the grains, while the substantially pure secondary phase generally forms the grain boundaries. The pure compounds mentioned for the secondary phase are located within the unstable region set forth in the Lange patent. The first noted compound is the so-called J phase, the second compound is the so-called K phase, and the third compound is the so-called H phase.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, in which:

BEST MODE AND INDUSTRIAL APPLICABILITY

Figure 1:
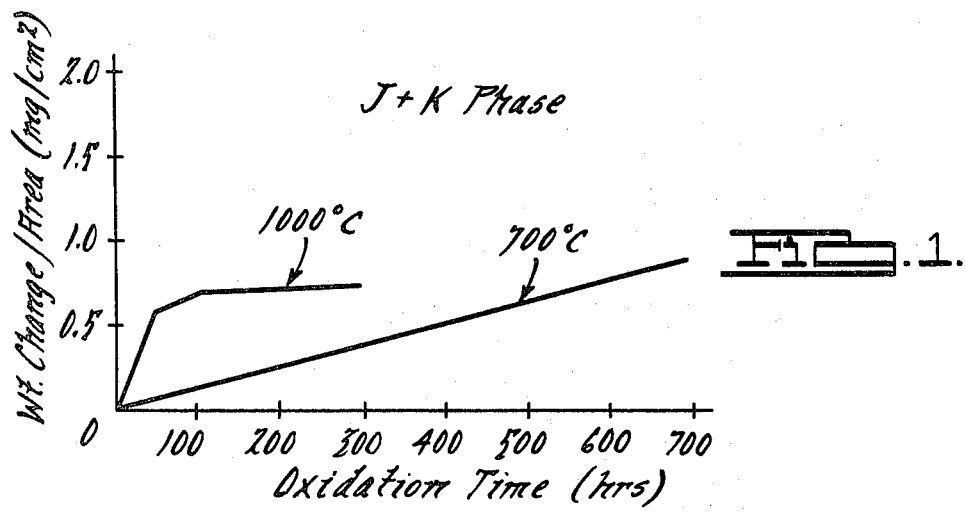
FIG. 1 is a graphical presentation of oxidation data expressed as the weight change per unit area of a mixed second phase system, that is a combination of J and K phases, under oxidizing conditions at 700° C. and 1000° C.

The following description is what we consider to be a preferred embodiment of the thermally stable ceramic material of our invention. The following description also sets forth what we now contemplate to be the best mode of making our thermally stable ceramic material. This description is not intended to be a limitation upon the broader principles and teachings of this ceramic material and it does not mean that the materials can only be made in the manner stated in the specific examples.

Basically, this invention is directed to a ceramic article made primarily from pure silicon nitride. Generally, the article is made by a reaction bonded process. In this process, the reaction bonded silicon nitride article is formed by reaction sintering of silicon particles which have been formed into the shape of a desired article. The silicon particles have as an impurity therein silicon dioxide. A densification aid, which in accordance with this invention is yttrium oxide, is incorporated into the reaction bonded silicon nitride article in order to obtain a densification of that article by sintering. The densification aid may be incorporated into the silicon particles used to make the reaction bonded silicon nitride article or it may be incorporated into the reaction bonded silicon nitride article after it has been made.

Generally, in order to make a reaction bonded silicon nitride article, one will slip cast silicon metal particles into the shape desired or injection mold silicon metal particles into the shape desired and then subsequently burn out the binder used for the injection molding operation. The sintering aid may be incorporated in the slip casting mixture or in the injection molding mixture so that it is already present when the general shape of the article is defined by the shaped silicon metal particles. As is well known in the art, after the article has been formed, the article is subjected to a nitriding operation to form a reaction bonded silicon nitride article. In accordance with the preferred embodiment of this invention, the densification aid is included in this reaction bonded silicon nitride article.

The so-formed reaction bonded silicon nitride article is then subjected to a sintering process. During the sintering process, the density of the article increases. This is accomplished because the particles of individual grains of powder first form necks between adjacent particles which become the grain boundaries. Between the grain boundaries, a liquid phase may exist. The densification proceeds by a reduction in the number and size of the spaces or pores between the particles as they migrate into these grain boundaries through a transport mechanism which is followed by a partial collapse or moving together of the center points of the grains, thus producing densification. Basically, the densified article will have grains of essentially pure silicon nitride material separated by grain boundaries formed from the densification aid present, silicon dioxide which is introduced as an unavoidable impurity along with the original silicon metal particles, and some silicon nitride.

As mentioned previously, the Lange patent reports that if the secondary phase composition falls in a particular area of the ternary diagram of the three elements mentioned, the resulting article will have a very poor oxidation resistance at 1000° C. We have found, however, that if the essentially pure primary phase of silicon nitride is separated by secondary phase grain boundaries consisting substantially of $Si_3N_4/SiO_2/4Y_2O_3$, or $Si_3N_4/SiO_2/2Y_2O_3$, or $Si_3N_4/4SiO_2/5Y_2O_3$, which are the so-called J, K or H phases from this ternary system, then the resulting article will have good oxidation resistance at 700°–1000° C., even though Lange teaches that this is not so. These materials will also have good strength retention after even 700 hours of oxidation exposure.

The following examples will demonstrate the new thermally stable ceramic material of this invention.

EXAMPLE 1

Reaction bonded silicon nitride test bodies, i.e., rectangular bars $\frac{1}{4}''\times 1''\times 1''$ were made by slip casting a composition containing 88% of silicon metal particles and 12% of yttrium oxide densification aid into a suitable mold. The so-formed test bars were then subjected to a nitriding operation which is carried out at temperatures up to 1400° C. under a nitrogen pressure of 0.02 MPa for 150–300 hours. The test bodies so made are reaction sintered silicon nitride bodies having a moderate density of approximately 85–86% of theoretical. During nitriding, the following reaction occurs: $Si+Y_2O_3+N_2\rightarrow Si_3N_4+Y_{10}Si_7O_{23}N_4$ (H phase). H phase is the densification aid.

The test bodies made in this manner are then packed in a packing powder having the composition 66% by weight silicon nitride, 9% by weight yttrium oxide and 25% by weight boron nitride.

The boron nitride is added to the packing powder to prevent the packing powder itself from sintering into a solid mass, which would make removal of the sintered part very difficult. Boron nitride is inert in this system and is simply an inert filler which physically prevents the packing powder from sintering into a hard, solid mass.

The sintering cycle for this material included a first stage of four hours at 1900° C. and 0.206 MPa of nitrogen atmosphere and a second stage of two hours at 1925° C.–1950° C. at 2.06 MPa pressure of nitrogen. This produced test bodies of a sintered silicon nitride material in which the primary phase was substantially pure grains of silicon nitride separated by a secondary phase which contained both the so-called J phase and the K phase of the ternary diagram of silicon nitride, silicon dioxide and yttrium oxide. As mentioned above, the J phase is $Si_3N_4/SiO_2/4Y_2O_3$, and the K phase is $Si_3N_4/SiO_2/2Y_2O_3$.

The oxidation resistance of this mixed phase material is shown in the graphical presentation of FIG. 1. The first curve shows the oxidation behavior at 1000° C. The percent weight change is up to 0.6 mg/cm$^2$ by approximately 50 hours exposure and slowly climbs up from this point upon further exposure. This material does not have a good oxidation resistance and it confirms what was stated in the Lange U.S. Pat. No. 4,102,698. The second curve, at 700° C., confirms that the material is unstable over the range of temperatures defined by Lange and Caruthers. It exhibits linear oxidation behavior and shows a weight change of 0.9 mg/cm$^2$ after 700 hours.

The mixed J and K material was found to exhibit severe strength reductions after the above oxidation exposures. After 300 hours exposure at 1000° C., a 91.8% strength loss was noted. The exact strength values are given in Tables I and II located near the end of this specification.

EXAMPLE 2

Reaction bonded silicon nitride test bodies were made according to the procedure described in Example 1. The test bodies were then packed in a packing powder having a composition 5–10 weight percent $SiO_2$, 9 weight percent $Y_2O_3$, 25 weight percent BN and the balance being $Si_3N_4$. The sintering cycle is 1900° C. for four hours at 0.206 MPa of nitrogen followed by two hours at 1950° C. and 2.06 MPa of nitrogen. The material produced using this procedure consists of silicon nitride with a secondary phase consisting of a mixture of H phase, $Si_3N_4/4SiO_2/5Y_2O_3$, and yttrium silicate, $Y_2Si_2O_5$.

Figure 2:
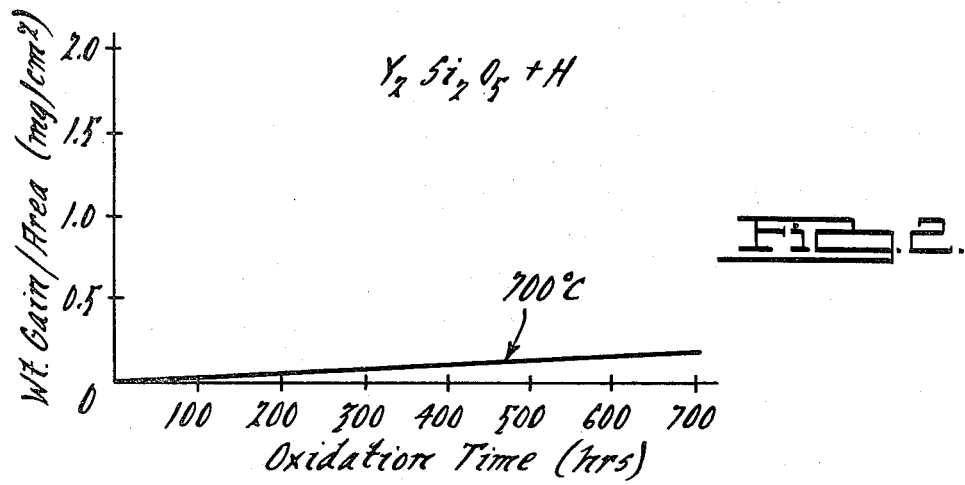
FIG. 2 is a graphical presentation of oxidation data of a mixed second phase system comprised of H phase plus yttrium silicate under oxidizing conditions of 700° C.

The oxidation behavior of this material is shown in FIG. 2 for 700° C. condition. The oxidation is linear and after 700 hours exhibits 0.2 mg/cm$^2$ weight change. This lower weight change could possibly be predicted from Lange's patent. However, this material also exhibits a severe strength degradation of 69% after 700 hours exposure, suggesting that the material is unstable under oxidizing conditions, even though the weight change is relatively low.

We have, however, discovered that if the secondary phase is not a mixed phase but is in fact either substantially pure J phase, substantially pure K phase, or substantially pure H phase, the material has a much improved oxidation resistance. This will be demonstrated by the following examples.

EXAMPLE 3

The entire procedure of Example 1 is repeated except that the sintering cycle is adjusted so that a single secondary phase of the J type is formed. This is accomplished by a sintering cycle in which a first stage of four hours at 1875°–1925° C. and 2.06 MPa pressure of nitrogen gas is used.

As stated above, this results in a finished ceramic material in which substantially pure grains of silicon nitride have grain boundaries therearound of a substantially pure secondary phase, in this case the so-called J phase.

Figure 3:
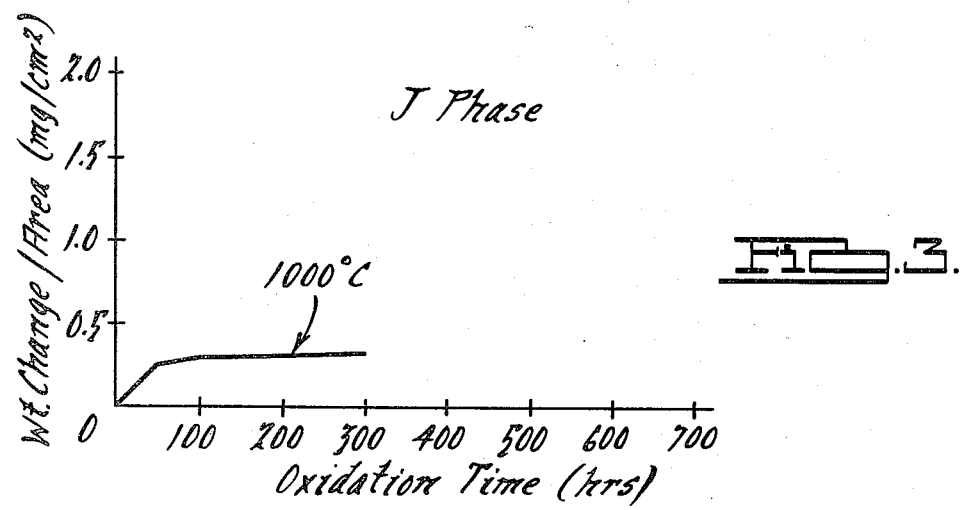
FIG. 3 is a graphical presentation similar to FIG. 1, only this FIG. 3 sets forth data on the oxidation of a ceramic material which includes a primary phase of substantially pure silicon nitride and a secondary phase of substantially pure J phase material at 1000° C.

A graphical presentation of the oxidation resistance of this material is depicted in FIG. 3. It is seen that at 300 hours the percent weight change is only slightly in excess of 0.3 mg/cm$^2$, below that reported for the mixed phase in FIG. 1. This material is acceptable from an oxidation resistance point, even though Lange reports that one should expect this material to have poor oxidation resistance characteristics. If the substantially pure J phase is the secondary phase by itself, and it does not have any other phases mixed in, it appears then that the overall body will have good oxidation resistant characteristics. This material shows a 11.4% strength increase after 300 hours of oxidation at 1000° C. This indicates that this material is indeed stable at these conditions.

EXAMPLE 4

The procedure of Example 1 is repeated, but in this example the secondary phase made is substantially pure K phase material. This phase is made by following the procedure of Example 1, with the exception that the following sintering cycle is used. The first phase of the sintering cycle is carried out for four to five hours at 1900°–1925° C. at a nitrogen pressure of 0.206 MPa, with a second stage carried for two to three hours at 1975° C. and 6.89–10.3 MPa pressure of nitrogen gas. The resulting material is a ceramic material having substantially pure primary phase of silicon nitride and a substantially pure secondary phase of so-called K phase material which is $Si_3N_4/SiO_2/2Y_2O_3$.

Figure 4:
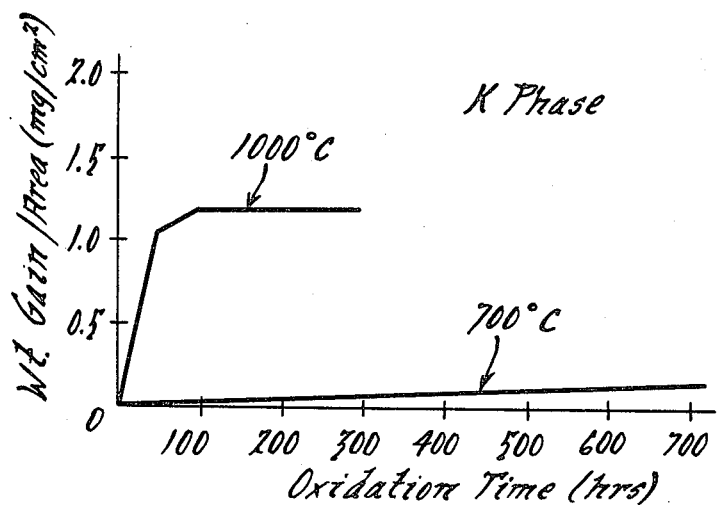
FIG. 4 is a graphical presentation similar to FIG. 3, but for a ceramic material having the primary phase formed of substantially pure silicon nitride and the secondary phase formed of substantially pure K phase material at 700° C. and 1000° C.

The oxidation resistance of the material made in accordance with Example 3 is graphically depicted in FIG. 4. Once again, the oxidation resistance of this material does not pass 0.10 mg/cm$^2$ by weight change up to 700 hours of testing at 700° C. This is substantially less than that reported for the mixed phase material in FIG. 1. The oxidation resistance of this material at 1000° C. is higher than reported for the mixed phase composition having a weight gain of 1.2 mg/cm$^2$ after 300 hours.

While the oxidation weight gains of this material are inconsistant relative to the behavior of the mixed phase compositions, the strength behavior after oxidation is superior. After 700 hours at 700° C. this material exhibited a 1.6% strength increase, while after 300 hours at 1000° C. the material exhibited a 1.8% strength increase. This again demonstrates the beneficial effect of having only one secondary phase present in the silicon nitride body.

EXAMPLE 5

The procedure of Example 1 is repeated to produce a material which is essentially $Si_3N_4$ plus a secondary phase of the H composition. In this example, the packing powder composition was 5 weight percent $SiO_2$, 9 weight percent $Y_2O_3$, 25 weight percent BN and the balance, 61 weight percent, being silicon nitride. The sintering conditions were four hours at 1900° C. and 0.206 MPa of nitrogen pressure followed by two hours at 1950° C. and 2.06 MPa of nitrogen.

Figure 5:
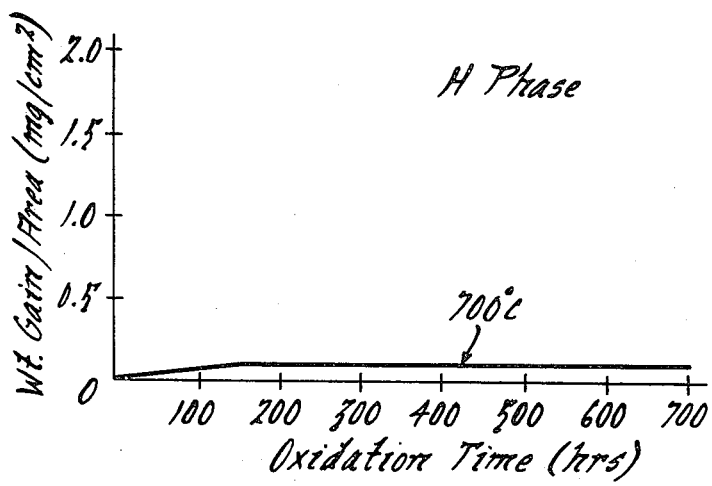
FIG. 5 is similar to FIG. 3 but for a ceramic material having the primary phase formed of substantially pure silicon nitride and the secondary phase formed of substantially pure H phase oxidized at 700° C.

The oxidation behavior of this material at 700° C. is given in FIG. 5. The oxidation weight gain is low, 0.1 mg/cm$^2$ after 700 hours. This material exhibited a 4.7% strength increase after 700 hours of oxidation. This demonstrates the good stability of this material.

EXAMPLE 6

The procedure of Example 1 is repeated to produce a material which is essentially $Si_3N_4$ plus a secondary phase of yttrium silicate ($Y_2Si_2O_7$), a material Lange says is stable. In this example, the packing powder composition was 15–25 weight percent $SiO_2$, 9 weight percent $Y_2O_3$, 25 weight percent BN with the balance being $Si_3N_4$. The sintering cycle was the same as Example 5, four hours at 1900° C. and 0.206 MPa of nitrogen followed by two hours at 1950° C. and 2.06 MPa of nitrogen.

Figure 6:
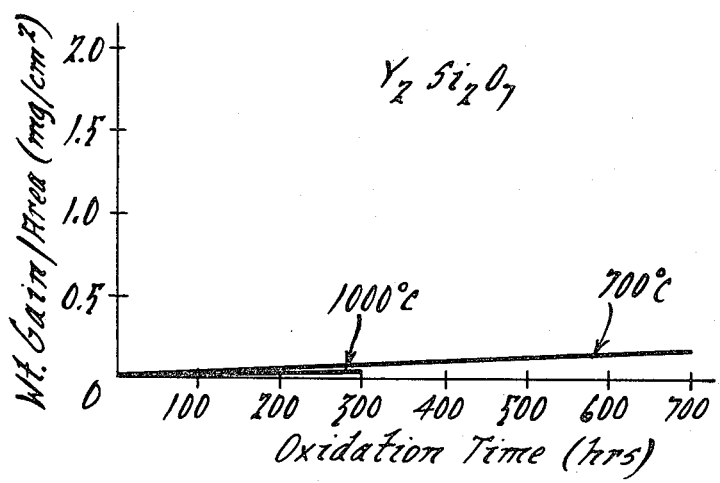
FIG. 6 is similar to FIG. 3 but for a ceramic material having the primary phase formed of substantially pure silicon nitride and the secondary phase is substantially pure yttrium silicate ($Y_2Si_2O_7$) oxidized at 700° C. and 1000° C.

The oxidation behavior of this material is shown in FIG. 6. The oxidation weight gains at both 700° C. and 1000° C. are below 0.1 mg/cm$^2$ after 700 and 300 hours respectively. The strength results indicate a 22% increase at 700 hours at 700° C. and no strength change after 300 hours at 1000° C., which proves Lange's prediction on this material was correct but not on the pure phases set forth in Examples 3, 4 and 5.

Examples 3–5 illustrate that the oxidation weight gains of a silicon nitride/single secondary phase material are generally low and that no strength degradations occur after 700 hours exposures at 700° C. or 300 hour exposures at 1000° C. Conversely, Examples 1–2 show that $Si_3N_4$/two secondary phase compositions can have equivalent weight gain behaviors as single secondary phase material, but in all case studies exhibited strength degradations of 16.4 to 91.8%. These severe strength losses after oxidation indicate that these materials are thermally unstable and poor engineering material.

TABLE I

| | 1000° Oxidation for 300 Hours | | | |
|---|---|---|---|---|
| Example No. | Secondary Phases | Initial Strength* | Strength After Oxidation | % Change in Strength |
| 1 | J + K | 650 MPa | 543 MPa | −16.4% |
| 2 | H + $Y_2Si_2O_5$ | 381 MPA | not tested | |

TABLE I-continued

1000° Oxidation for 300 Hours

| Example No. | Secondary Phases | Initial Strength* | Strength After Oxidation | % Change in Strength |
|---|---|---|---|---|
| 3 | J | 540 MPa | 602 MPa | +11.4% |
| 4 | K | 618 MPa | 629 MPa | +1.8% |
| 5 | H | 502 MPa | not tested | |
| 6 | Y$_2$Si$_2$O$_7$ | 316 MPa | 316 MPa | 0% |

*The strength data is an average of 3-6 test bars 3.1 × 5.1 × 25.4 mm tested in four point modulus of rupture. Test temperature in all cases was room temperature.

TABLE II

700° Oxidation for 700 Hours

| Example No. | Secondary Phases | Initial Strength* | Strength After Oxidation | % Change in Strength |
|---|---|---|---|---|
| 1 | J + K | 650 MPa | 53 MPa | −91.8% |
| 2 | H + Y$_2$Si$_2$O$_5$ | 381 MPa | 116 MPa | −69% |
| 3 | J | 540 MPa | not tested | |
| 4 | K | 618 MPa | 628 MPa | +1.6% |
| 5 | H | 502 MPa | 525 MPa | +4.7% |
| 6 | Y$_2$Si$_{12}$O$_7$ | 192 MPa | 261 MPa | +36% |

*See Table I for explanation.

While particular embodiments of the invention have been illustrated and described, it will be obvious to those skilled in the art that various changes and modifications may be made without departing from the invention, and it is intended to cover the appended claims all such modifications and equivalents as fall within the true spirit and scope of this invention.

We claim:

1. A thermally stable material which consists of:
a substantially pure primary phase formed of substantially pure silicon nitride; and
a substantially pure secondary phase formed of a material selected from the group consisting of Si$_3$N$_4$/SiO$_2$/4Y$_2$O$_3$, Si$_3$N$_4$/SiO$_2$/2Y$_2$O$_3$, Si$_3$N$_4$/4SiO$_2$/5Y$_2$O$_3$, wherein said primary phase forms individual grains and said secondary phase forms grain boundaries between said individual grains.

* * * * *